United States Patent [19]

Wachsman

[11] Patent Number: 5,456,807
[45] Date of Patent: Oct. 10, 1995

[54] METHOD AND APPARATUS FOR TREATING NITROGEN OXIDE-CONTAINING GAS STREAMS USING A COMBINED ELECTROCHEMICAL-SORBENT APPROACH

[75] Inventor: Eric Wachsman, Palo Alto, Calif.

[73] Assignee: Gas Research Institute, Chicago, Ill.

[21] Appl. No.: 208,359

[22] Filed: Mar. 9, 1994

[51] Int. Cl.[6] .............................. C25B 1/00; C25B 9/00
[52] U.S. Cl. .................. 204/59 R; 204/252; 423/239.1; 422/169; 422/178; 422/180
[58] Field of Search .................................. 204/59 R, 60, 204/130, 186, 252, 245, 263, 265, 631; 423/210, 239.1; 95/129; 422/168, 169, 173, 178, 180

[56] References Cited

U.S. PATENT DOCUMENTS

| | | | |
|---|---|---|---|
| 4,253,925 | 3/1981 | Mason | 204/129 |
| 4,426,365 | 1/1984 | Magder | 423/239.1 |
| 4,659,448 | 4/1987 | Gordon | 204/277 |

FOREIGN PATENT DOCUMENTS 5171482  7/1993  Japan .

OTHER PUBLICATIONS

R. Mahhaligan et al., "Catalysts Development and Evaluation in the Control of High–Temperature $NO_x$ Emissions", *The American Institute of Chemical Engineers* 77(211): 9–25 (1981) No month available.

S. Pancharatram et al., "Catalytic Decomposition of Nitric Oxide on Zirconia by Electrolytic Removal of Oxygen", *Journal of Electrochemical Society* 122:869–875 (1975) No month available.

E. F. Sverdrup et al., "Design of High–Temperature Solid–Electrolyte Fuel–Cell Batteries for Maximum Power Output per Unit Volume", *Energy Conversion* 13:129–141 (1973).

Primary Examiner—Kathryn Gorgos
Attorney, Agent, or Firm—Speckman, Pauley & Fejer

[57] ABSTRACT

A method is provided for selectively removing nitrogen oxides from gaseous mixtures using alkali and/or alkaline earth oxides as sorbents, followed by conversion of the adsorbed $NO_x$ into $N_2$ and $O_2$ using a solid-oxide electrochemical cell. The method is useful for treating many sources of nitrogen oxide pollutants, e.g., vehicle exhaust, industrial manufacturing, coal burning, and the like.

31 Claims, 8 Drawing Sheets

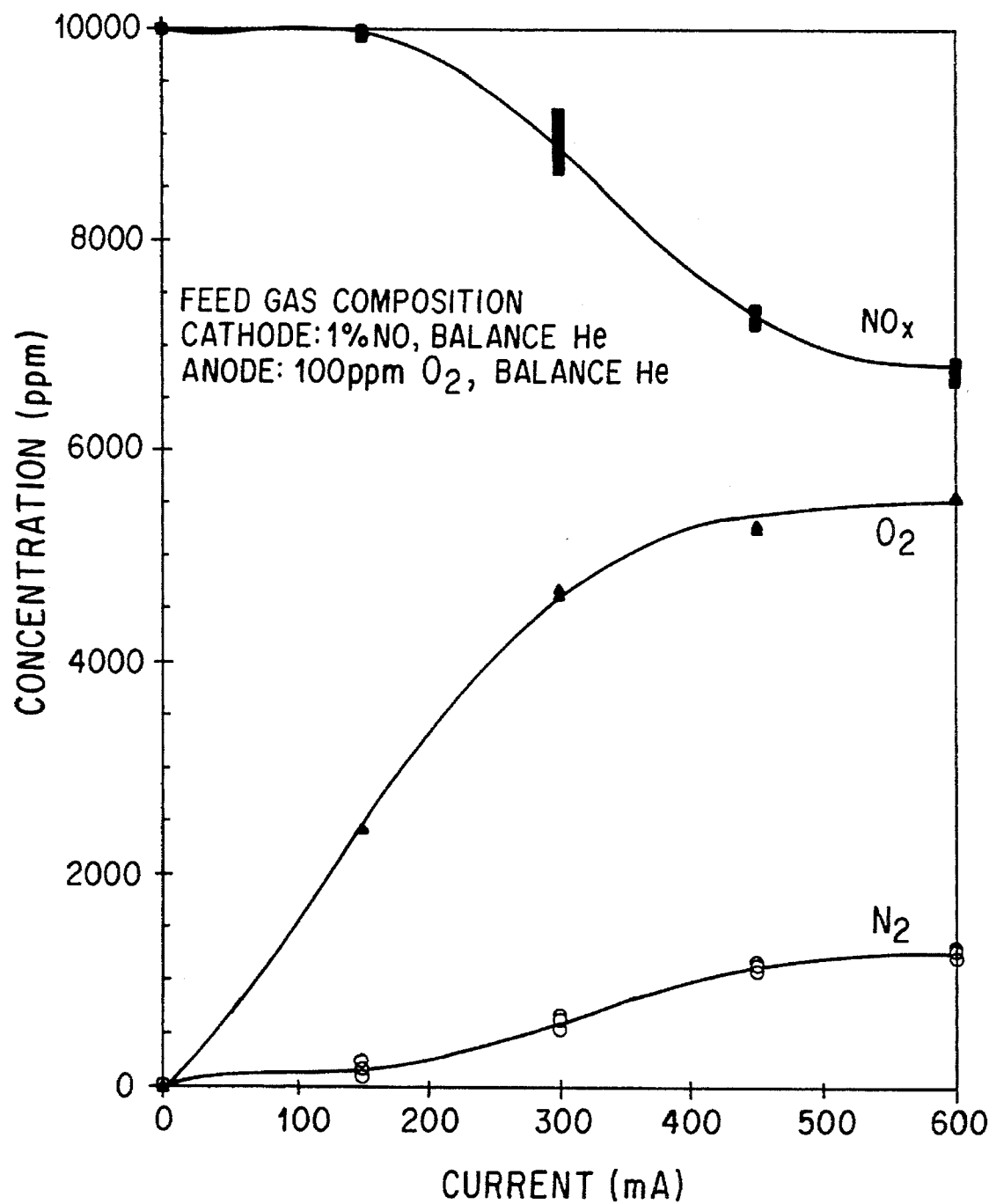
F I G. 8

METHOD AND APPARATUS FOR TREATING NITROGEN OXIDE-CONTAINING GAS STREAMS USING A COMBINED ELECTROCHEMICAL-SORBENT APPROACH

TECHNICAL FIELD

The present invention relates generally to the treatment of nitrogen oxide-containing gas streams, and more particularly relates to a novel apparatus and method for selective adsorption of nitrogen oxides and subsequent dissociation thereof. The invention involves the combination of a sorbent material for selectively adsorbing nitrogen oxides and a solid-oxide electrochemical cell for converting the adsorbed nitrogen oxides to $N_2$ and $O_2$.

BACKGROUND

Many approaches have been taken to effect the removal and/or decomposition of nitrogen oxides (NO and $NO_2$; together referred to herein as "$NO_x$") from gaseous mixtures containing them. Nitrogen oxides surface as pollutants in a wide variety of contexts. Primarily, nitrogen oxides appear as pollutants in combustion processes; thus, they are present in coal, natural gas and diesel combustion, vehicular exhaust, and various refining and industrial manufacturing applications. Currently, $NO_x$ emission is estimated to be at least 20 million tons per year, with combustion of fuel the main source of $NO_x$ generation. To date, however, the various solutions which have been proposed to deal with $NO_x$ pollution have been unsatisfactory in one respect or another.

U.S. Pat. No. 4,659,448 to Gordon summarizes several of the approaches which have been taken to address $NO_x$ pollution. One approach is that described by R. Mahhaligam et al. in "Catalysts Development and Evaluation in the Control of High-Temperature $NO_x$ Emissions", *The American Institute of Chemical Engineers* 77(211):9–25 (1981), which involves passing gas mixtures containing $NO_x$ through a heated nickel and cobalt catalyst bed, contained in a ceramic tube. Other approaches cited in the Gordon patent include the following: that described by S. Pancharatram et al., in "Catalytic Decomposition of Nitric Oxide on Zirconia by Electrolytic Removal of Oxygen", *Journal of Electrochemical Society* 122:869–875 (1975); that described by E. F. Sverdrup et al. in "Design of High-Temperature Solid-Electrolyte Fuel-Cell Batteries for Maximum Power Output per Unit Volume", *Energy Conversion* 13:129–141 (1973); and the catalytic dissociation apparatus of U.S. Pat. No. 4,253,925 to Mason. This latter reference describes use of a "stabilized" oxygen-ion oxide as a solid electrolyte in the form of a film. A gaseous stream is passed along the cathodic surface of the electrolyte while the anodic surface is exposed to air; nitrogen oxides contained in the gaseous stream catalytically dissociate at the cathodic surface. The process is conducted at a temperature in the range of 400° C. to 1000° C. while applying a unidirectional electric field through the electrolyte by means of a direct current voltage source. The Gordon patent involves use of a system similar to that described in the Mason patent.

The present invention is directed to a new system which provides for a number of advantages relative to the systems of the prior art. First, the invention provides for selective adsorption of $NO_x$ from a gaseous stream containing a mixture of gases; that is, a sorbent material is provided which preferentially adsorbs $NO_x$ relative to other gases such as oxygen. Second, the sorbent material used is such that formation of thermodynamically stable surface nitrates and nitrites is highly favored, ensuring removal of virtually all of the $NO_x$ contained within the gaseous stream undergoing treatment. Third, the invention enables decomposition of the adsorbed $NO_x$ into $N_2$ and $O_2$ using a solid-oxide electrolyte in the form of an easily manufactured, compact, self-contained unit. Fourth, only a small direct current (dc) potential (on the order of 1 V) is needed for operation. Finally, the present process eliminates the need for potentially toxic or corrosive scavenging reagents necessary with many current $NO_x$ processing systems. It should also be noted that the invention may be adapted for use in conjunction with adsorption and decomposition of sulfur oxides using substantially the same equipment and procedures.

RELATED ART

In addition to that summarized above, the following references relate to methods and/or manufacturing systems for addressing $NO_x$ pollution:

Japanese (Kokai) Patent Publication No. 02254215, which describes an apparatus for adsorbing and decomposing $NO_x$ using a Y-zeolite or $CuO/Cr_2O_3$ cathode for converting $NO_x$ to $N_2$ and $O^{2-}$, a solid electrolyte, such as of $ZrO_2$, $CeO_2$, or the like, and an anode, such as $La_{1-z}Sr_zCoO_3$, for converting $O^{2-}$ to $O_2$ (like the Gordon and Mason patents, the reference relates to the use of a solid electrolyte for reducing nitrogen oxides to $N_2$ and $O_2$);

Japanese (Kokai) Patent Publication No. 63190624, which describes a method for treating $NO_x$-containing exhaust gas using a palladium-coated solid electrolyte body and a porous electrode containing implanted metal such as Cu, V, Mn or the like;

Japanese (Kokai) Patent Publication Nos. 04190830 and 90319521, which describe a method for removing $NO_x$ from gaseous streams by contacting the gaseous stream with an ion conductive solid electrolyte body in such a way as to generate hydrogen ions, transferring the hydrogen ions to a cathodic surface, and reducing the $NO_x$ using the deposited hydrogen; and Japanese (Kokai) Patent Publication No. 61078421, which describes a denitration apparatus consisting of a solid electrolyte body and platinum electrodes, structured so that the $NO_x$-containing gaseous stream is introduced into the device through the surface of the negative electrode while dc current is passed between the electrodes.

In addition, U.S. Pat. No. 3,650,920 to Hickam et al. describes a solid electrolyte oxygen ionic conductive ceramic tube, e.g., comprising thoria or zirconia and oxides of calcium, to dissociate gaseous oxide pollutants such as NO and $NO_2$.

BRIEF DESCRIPTION OF THE DRAWINGS

FIG. 8 depicts the effect of current on $NO_x$ reduction (using a chemiluminescence detector) and $N_2$ formation (as detected by gas chromatography) at the cathode, and $O_2$ formation (using an oxygen sensor) at the anode of a solid-oxide electrochemical cell.

SUMMARY OF THE INVENTION

Figure 1:
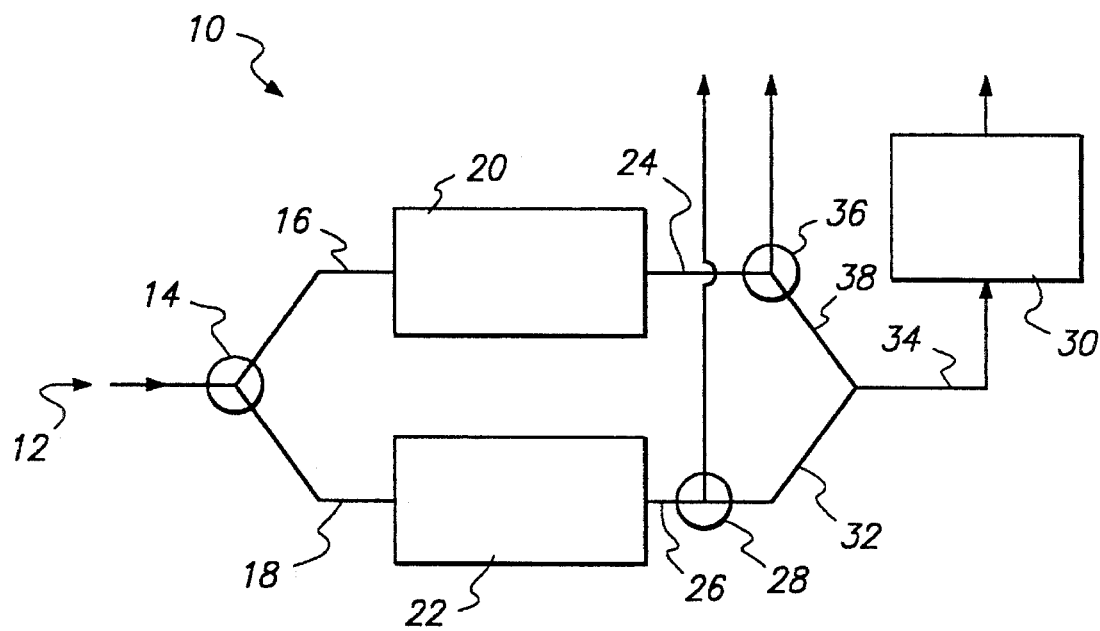
FIG. 1 schematically illustrates the present process for removing nitrogen oxides from a $NO_x$-containing feed gas.

Accordingly, it is a primary object of the invention to address the above-mentioned needs in the art by providing a method for treating $NO_x$-containing gaseous streams to remove $NO_x$ therefrom.

It is another object of the invention to provide such a method which additionally involves decomposition of the removed $NO_x$.

It is still another object of the invention to provide such a method which involves the use of a selective sorbent material for preferentially removing $NO_x$ from a mixture of gases, in conjunction with a solid-oxide electrochemical cell for electrochemically reducing the $NO_x$ to $N_2$ and $O_2$.

It is a further object of the invention to provide an apparatus for carrying out the aforementioned method.

It is still a further object of the invention to provide such an apparatus which involves a selective sorbent material for preferentially removing $NO_x$ from a mixture of gases, and a solid-oxide electrochemical cell for decomposing the adsorbed $NO_x$ to $N_2$ and $O_2$.

Additional objects, advantages and novel features of the invention will be set forth in part in the description which follows, and in part will become apparent to those skilled in the art upon examination of the following, or may be learned by practice of the invention.

In one aspect, then, a method is provided for removing $NO_x$ from a gaseous composition and once removed, converting the $NO_x$ to $N_2$ and $O_2$. The initial step of the process involves passing the gaseous stream through an $NO_x$ sorbent such as an alkali metal oxide or alkaline earth metal oxide so as to selectively adsorb the relatively dilute $NO_x$. A concentrated stream of $NO_x$ is then desorbed by heating and then electrochemically reduced to $N_2$ and $O_2$ using a solid-oxide electrochemical cell. The electrochemical cell can be in the form of an electrolyte sheet, tube, or other configuration, coated with current-carrying electrodes and connected to a direct current power source such that one side of the electrode is a cathode while the other is an anode.

DETAILED DESCRIPTION OF THE INVENTION

It is to be understood that this invention is not limited to specific sorbent materials, specific electrolytes, or to particular apparatus configurations as such may, of course, vary. It is also to be understood that the terminology used herein is for the purpose of describing particular embodiments only and is not intended to be limiting.

It must be noted that, as used in the specification and the appended claims, the singular forms "a", "an" and "the" include plural referents unless the context clearly dictates otherwise. Thus, for example, reference to "a sorbent material" includes mixtures of sorbent materials, reference to "an electrolyte material" includes mixtures of two or more electrolyte materials, and the like.

In this specification and in the claims which follow, reference will be made to a number of terms which shall be defined to have the following meanings:

The term "$NO_x$" is intended to refer to any molecular species consisting of nitrogen and oxygen, e.g., NO, $NO_2$, $N_2O$, $N_2O_4$ or combinations thereof.

The term "gaseous stream" as used to refer to the initial gas composition undergoing treatment intends any gaseous composition containing $NO_x$.

The term "sorbent" is used herein in its usual sense to indicate a material which adsorbs a component of interest from a given composition.

FIG. 1 schematically illustrates the method and apparatus of the invention. Turning now to that figure, the $NO_x$ removal and conversion device is shown generally at 10. The feed gas is introduced into the apparatus at inlet 12, and is directed by means of switching valve 14 through either line 16 or line 18 to sorbent cells 20 or 22, respectively, which are typically encased in metallic containers. In alternative embodiments, a single sorbent cell may be used, or two or more sorbent cells may be used, configured either in series or in parallel.

The choice of line and sorbent cell is determined by the temperature of the sorbent, as it is preferred that the feed gas be directed into the cooler cell, i.e., having a temperature of less than about 500° C. Generally, the feed gas will contain on the order of 1 to 10,000 ppm $NO_x$, more typically 10 to 1000 ppm $NO_x$, with oxygen, carbon dioxide, nitrogen and other gases representing the remainder of the gaseous composition. The sorbent cells are comprised of an alkali metal salt hydroxide or oxide (salts hydroxides or oxides of Group IA elements), an alkaline earth metal salt or oxide (salts or oxides of Group IIA elements), or a mixture thereof. Alkali metal salts and alkaline earth metal salts include carbonates, and the like. Alkali metal oxides include lithium oxide, sodium oxide, potassium oxide, rubidium oxide, cesium oxide and francium oxide, while alkaline earth metal oxides include beryllium oxide, magnesium oxide, calcium oxide, strontium oxide, barium oxide and radium oxide. Mixed oxides include mixtures of any two or more of the above oxides, e.g., lithium-magnesium oxide (i.e., magnesium oxide surface-impregnated with lithium oxide). Particularly preferred materials for the sorbent cells are calcium oxide, magnesium oxide, lithium-magnesium oxide and sodium carbonate (available under the trademark NOXSO® from NOXSO Corp., Bethel Park, Pa.).

When the feed gas reaches the sorbent cell, the $NO_x$ is adsorbed by the selected sorbent material and converted, on the sorbent surface, to form metal nitrates and nitrites (from NO, $NO_2$ and $O_2$ present in the feed gas). After a sufficient amount of the feed gas has entered the sorbent cell, desorption is effected by heating the sorbent, preferably to a temperature on the order of 600° C. or higher, using any suitable heating means, and then venting the effluent through line 24, when sorbent cell 20 is used, and through line 26, when sorbent cell 22 is used. Switching valve 28 may be used to direct the effluent to the solid-oxide electrochemical cell 30 through lines 32 and 34. Similarly, switching valve 36 may be used to direct the concentrated $NO_x$ effluent from sorbent cell 20 through lines 38 and 34 to the solid-oxide electrochemical cell After desorption of $NO_x$ effluent, the sorbent cell which was used is allowed to cool, during which time the alternative sorbent cell may be used to treat the next infusion of feed gas.

Figure 2:
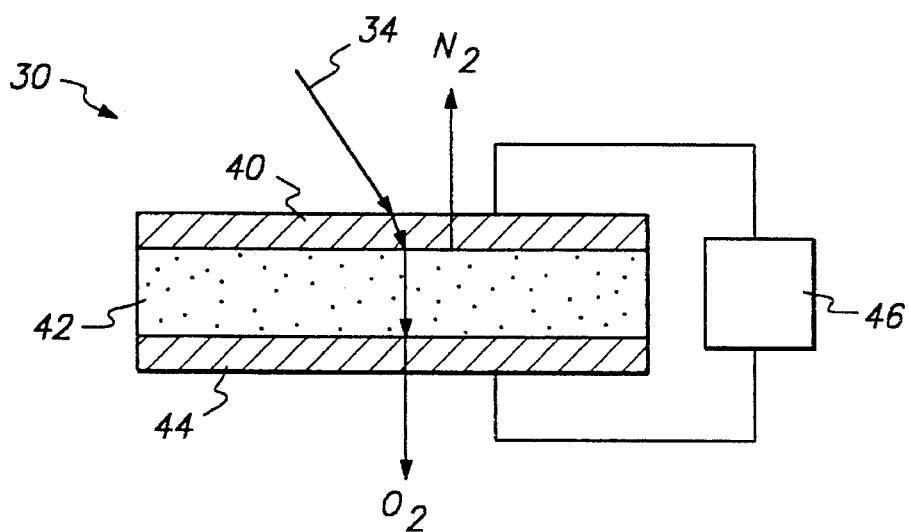
FIG. 2 schematically illustrates the solid-oxide electrochemical $NO_x$ reduction cell.

The solid-oxide electrochemical cell 30 is illustrated in more detail in FIG. 2. The $NO_x$ effluent from sorbent cell 20 or 22 is introduced into the cell through the exposed face of cathode 40, in which, after application of a relatively small dc potential (on the order of about 1 V) using power source 46, $NO_x$ is directly reduced to produce $N_2$ and solid-phase oxygen ions $O^{2-}$. The $O^{2-}$ ions are transported through the oxygen-ion electrolyte 42 and combine at anode 44 to form gaseous $O_2$. These reactions may be represented as follows:

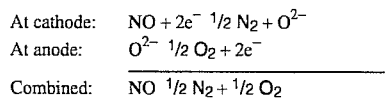

The materials used for the electrodes may be metallic (e.g., platinum), or they may be comprised of mixed conductive materials (e.g., lanthanum, strontium and manganese, or lanthanum, strontium and cobalt). The electrolyte may be comprised of any metal oxide which exhibits $O^{2-}$ conductivity, e.g., zirconium, cerium or bismuth oxide optionally stabilized or doped with a lanthanum oxide (such materials include erbia-stabilized bismuth oxide $((Er_2O_3)_{0.2}(Bi_2O_3)_{0.8}$, or "ESB") and yttria-stabilized zirconium oxide), or other metal oxides which enhance conductivity.

As will be appreciated by those skilled in the art, a number of cell configurations are possible, e.g., monolithic (as may be obtained from Argonne), planar (available from Ceramatech or Ztek), and tubular (as may be obtained from Westinghouse).

The combined sorbent cell/solid-oxide electrochemical cell apparatus thus functions to selectively remove substantially all nitrogen oxides present in an initial gaseous composition and convert them to $N_2$ and $O_2$, without need for the relatively complicated equipment, high voltages, and potentially toxic scavenging reagents required with the majority of prior art devices and procedures.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

EXPERIMENTAL

The following examples are put forth so as to provide those of ordinary skill in the art with a complete disclosure and description of how to use the invention, and is not intended to limit the scope of what the inventor regards as his invention. Efforts have been made to ensure accuracy with respect to numbers (e.g., amounts, temperature, etc.) but some errors and deviations should be accounted for. Unless indicated otherwise, parts are parts by volume, temperature is in °C. and pressure is at or near atmospheric.

EXAMPLE I

Selective Adsorption Studies

To evaluate the above approach, adsorption and desorption experiments were performed on alkaline earth oxides MgO and CaO and on an MgO sample that was surface impregnated with an alkaline oxide ($Li_2O$). Puratonic grade samples of MgO and CaO were obtained from Alfa Products and calcined in air to 1,000° C. A Li-MgO, a 0.3 wt % $Li_2O$ surface-impregnated sample of MgO, was prepared by wet impregnation in a $LiNO_3$ solution followed by calcining in air at 700° C.

During the experiments, a mass spectrometer was used. Eight mass spectrometer signals (m/e=46, $NO_2$; 44, $N_2O$ and $CO_2$; 32, $O_2$; 30, NO; 28, $N_2$ and CO; 16, O; 14, N; 12, C) were measured. The cracking patterns (m/e=14 vs. 12) were used to determine the origin of the m/e=28 and 44 signals wherever possible.

Figure 3:
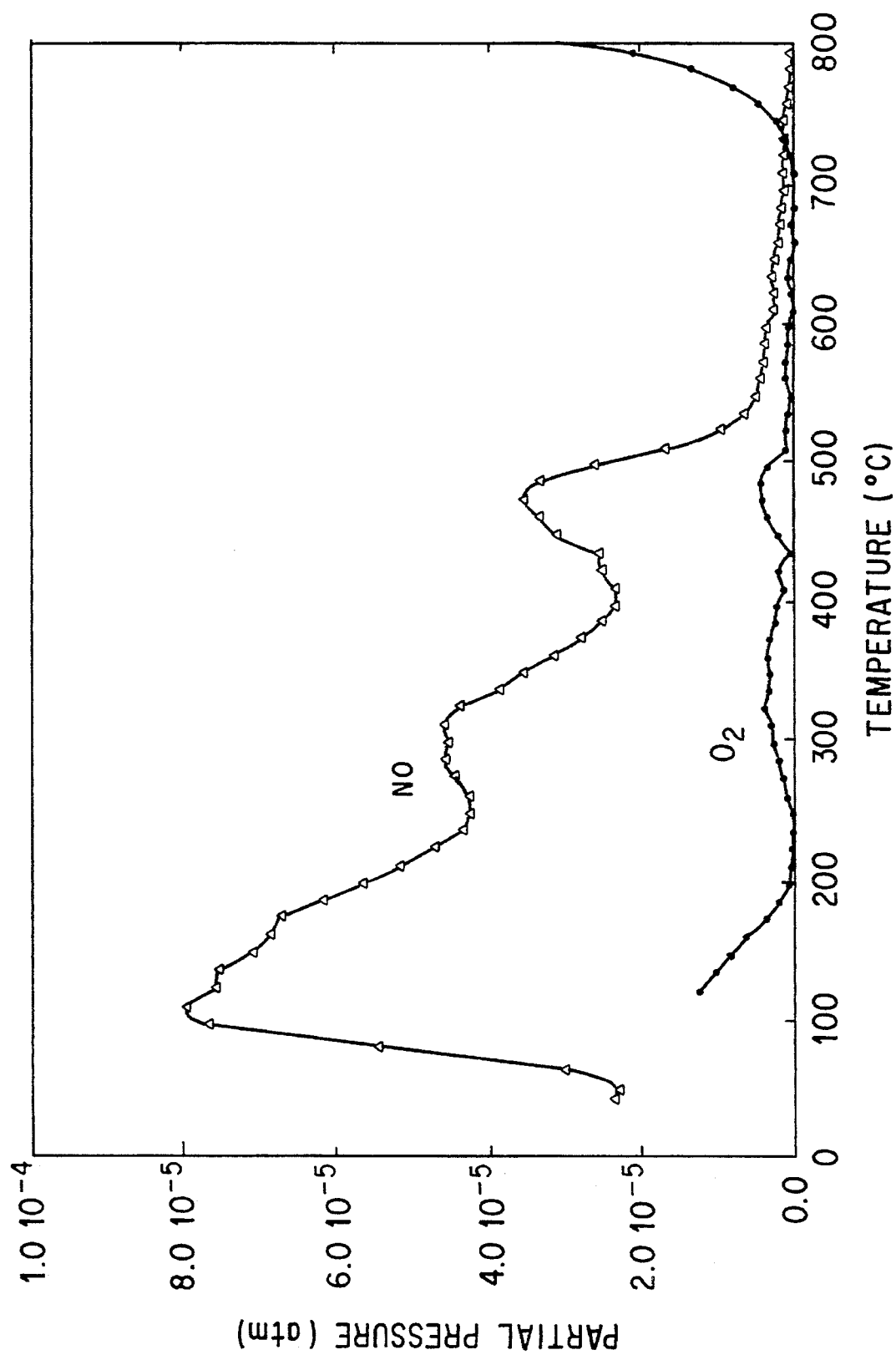
FIG. 3 depicts the desorption profile after adsorption from an $NO/O_2$ mixture on MgO.
Figure 4:
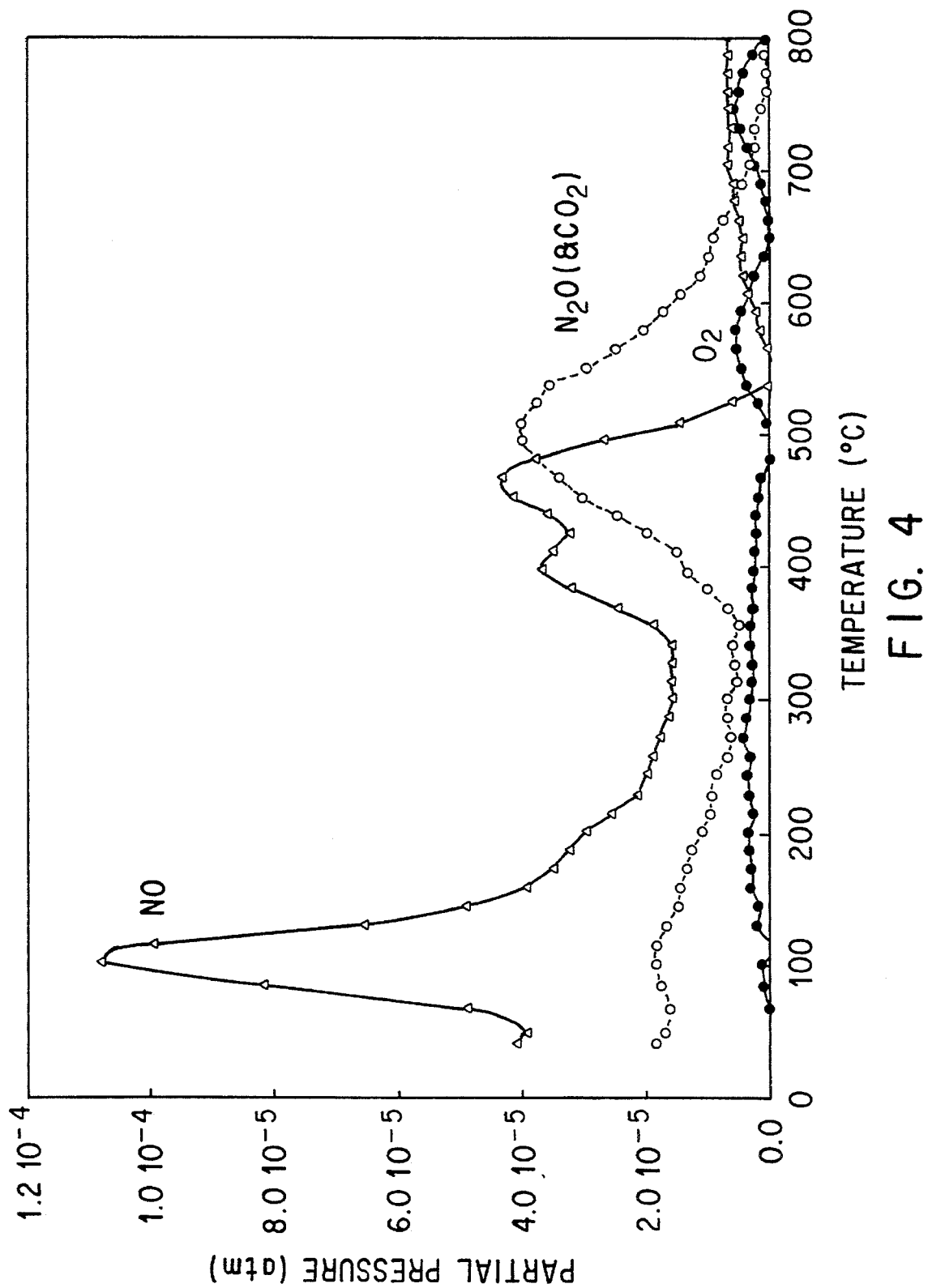
FIG. 4 depicts the desorption profile after adsorption from an $NO/O_2$ mixture on CaO.

The desorption profiles after adsorption from an $NO/O_2$ mixture are shown in FIGS. 3 and 4 for MgO and CaO, respectively. The primary result from the experiment is that the presence of $O_2$ did not impede the adsorption of NO. The NO was strongly adsorbed and $O_2$ adsorption in the competitive adsorption experiments was minimal. Furthermore, there appears to be greater NO adsorption in the presence of $O_2$ than without it. Oxygen enhancement of NO adsorption is most likely due to the formation of a surface nitrate ($NO_3^-$) or nitrite ($NO_2^-$) species.

Figure 5:
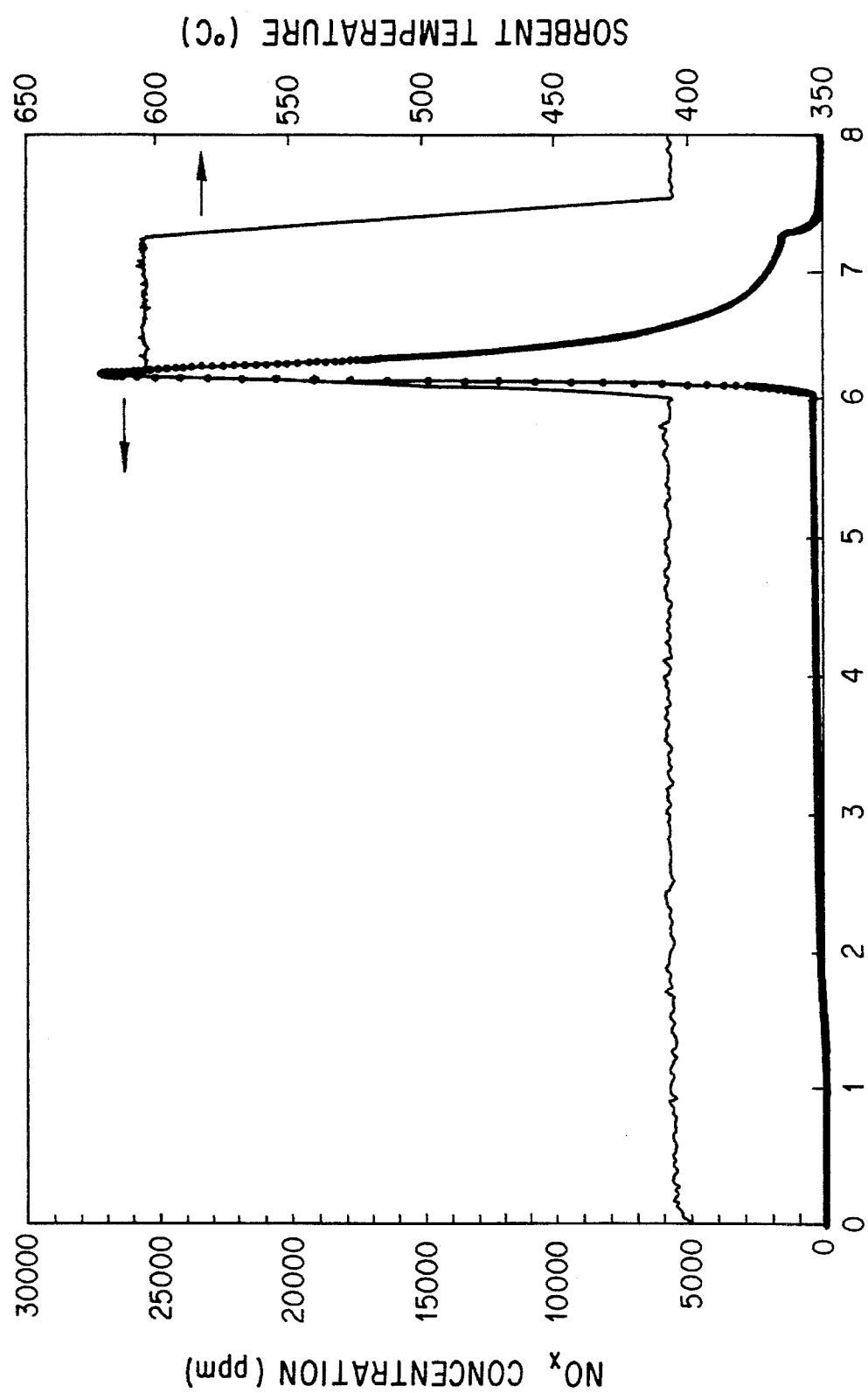
FIG. 5 depicts a sorbent $NO_x$ adsorption/desorption cycle using sodium carbonate (NOXSO®) as the sorbent.

A typical sorbent adsorption/desorption cycle is depicted in FIG. 5. In this particular experiment, the sorbent was NOXSO® (sodium carbonate on alumina) and the feed gas was 500 ppm NO, 5% $O_2$. As one can readily observe, the NO was adsorbed over the first 6 hours of the experiment. When the temperature of the sorbent body was increased, desorption of a concentrated $NO_x$ effluent was effected.

EXAMPLE II

Electrochemical Cell Studies

Solid-oxide electrochemical cells of Pt/ESB/Pt or Pt/YSZ/Pt (using erbia-stabilized bismuth oxide or yttria-stabilized zirconia electrolytes and platinum electrodes) were prepared. Electrodes were deposited on either side of an electrolyte disk to form a metal/electrolyte/metal layered structure. The deposition procedure consisted of applying a metal-suspension ink followed by drying and sintering.

Combined coulometric and gas phase analysis data were obtained at 700° and 900° C. with varying compositions of $O_2$ and NO in He on the cathode side and He (containing 100 ppm $O_2$) on the anode side.

Figure 6:
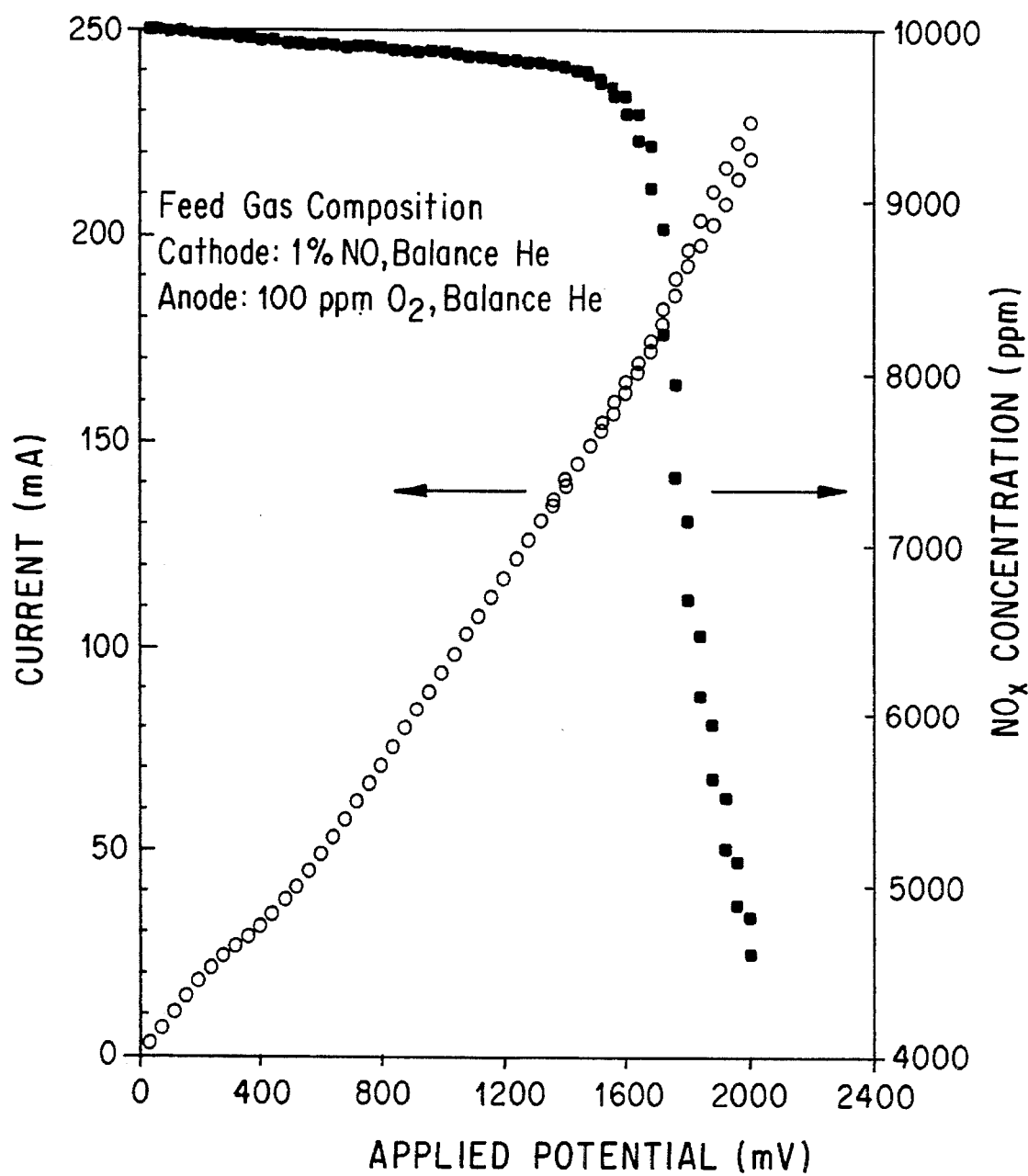
FIG. 6 depicts the increase in current and decrease in $NO_x$ concentration as a function of applied potential for a Pt/YSZ/Pt cell at 700° C.

FIG. 6 shows the increase in current and decrease in $NO_x$ concentration observed with increasing voltage. This effect was observed with both the YSZ and ESB electrolytes.

Figure 7:
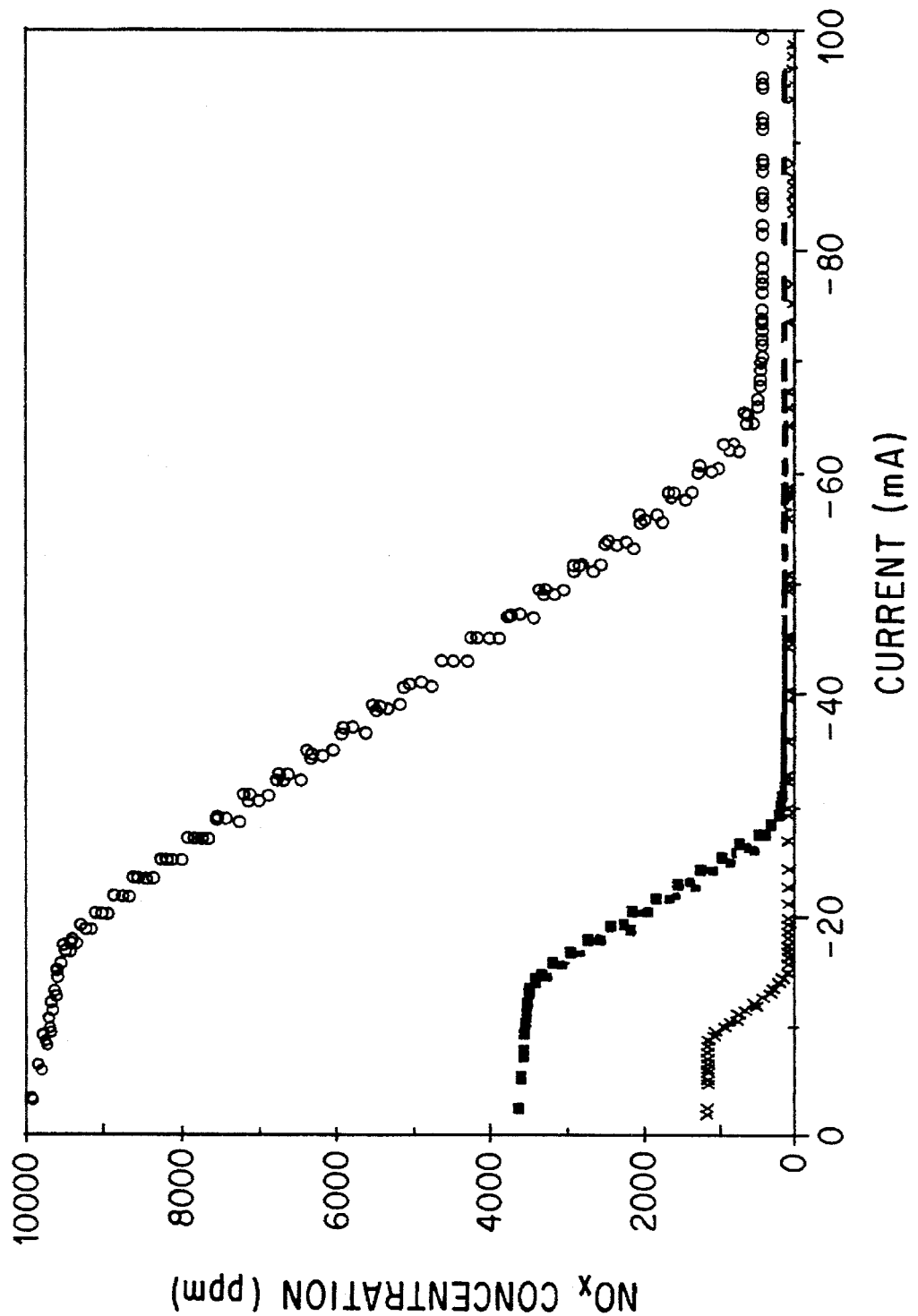
FIG. 7 depicts $NO_x$ concentration as a function of current for different solid-oxide electrochemical cell inlet NO concentrations.

FIG. 7 shows the decrease in $NO_x$ concentration in the solid-oxide electrochemical cell effluent as a function of current for different inlet NO concentrations. These results show that, for any given NO inlet concentration, greater than 98% conversion can be achieved using a solid-oxide electrochemical cell constructed as described above.

FIG. 8 shows the decrease in $NO_x$ concentration (determined using a chemiluminescence detector) and increase in $N_2$ concentration (determined with a GC) in the cathode effluent, and the increase in $O_2$ concentration (measured by the oxygen sensor) in the anode effluent, with increasing current. The GC analysis of $N_2$ formation is quantitatively consistent (within experimental error) with the chemiluminescence detector analysis of NO reduction. These results are significant because they confirm that NO is directly decomposed to $N_2$ and $O_2$ by the above-described process.

EXAMPLE III

Combined Sorption/Solid-Oxide Electrochemical Cell Approach

Figure 9:
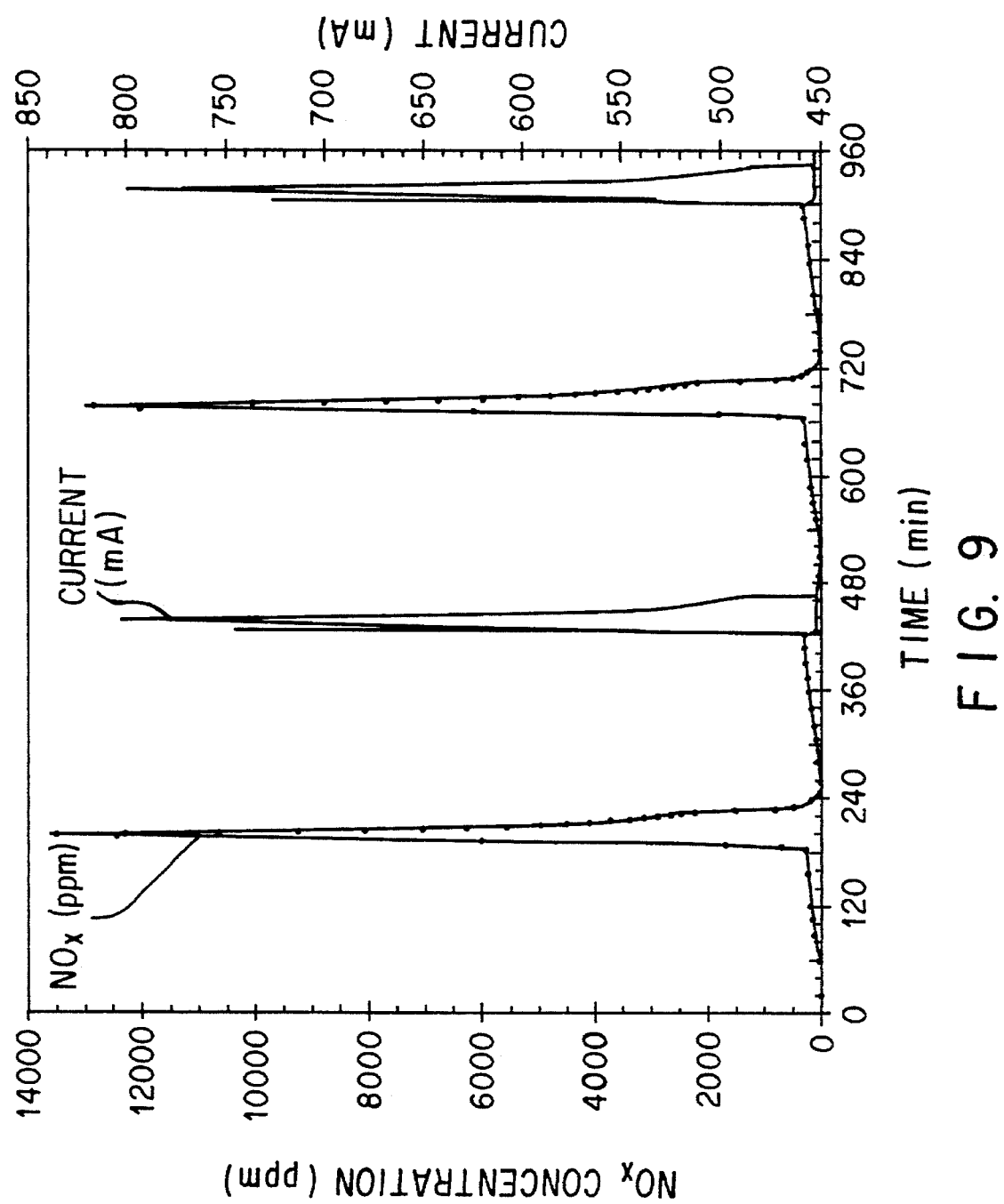
FIG. 9 depicts the results of a combined sorbent/solid-oxide electrochemical cell reduction of $NO_x$ from a 500 ppm NO, 5% $O_2$ feed stream.

FIG. 9 depicts the results of a combined sorbent/solid-oxide electrochemical cell reduction of $NO_x$ from a 500 ppm NO, 5% $O_2$ feed stream. The sorbent used in this experiment was NOXSO® (sodium carbonate on alumina) and the solid-oxide electrochemical cell was as described in Example II. Four cycles of adsorption/desorption are depicted; the first and third show the detection of $NO_x$ for a adsorption/desorption cycle with the solid-oxide electrochemical cell off (i.e., no voltage applied), while the second and fourth show the detection of $NO_x$ for a cycle with the solid-oxide electrochemical cell on (i.e., voltage applied). The applied dc voltage in the second and fourth cycles was +3.5 volts. The adsorption from a feed stream of 180 cc/min was observed for 180 min at 300° C. to begin each cycle. Desorption was effected by raising the temperature to 600° C. for 15 min at a flow rate of 30 cc/min. The first and third cycles show the increase in $NO_x$ concentration in the effluent from the sorbent body absent reduction thereof by the solid-oxide electrochemical cell. When a fixed voltage of +3.5 volts was applied to the solid-oxide electrochemical cell, as depicted in second and fourth cycles, an increase in current was observed, as well as a greater than 98% reduction of effluent $NO_x$ by the solid-oxide electrochemical cell.

I claim:

1. A method for treating a gaseous stream containing $NO_x$, comprising:
   (a) passing the gaseous stream through a sorbent body comprised of an alkali metal salt, an alkali metal oxide, an alkaline earth metal salt, an alkaline earth metal oxide, or a mixture thereof, at a temperature of less than about 500° C., for a period of time to remove substantially all of the $NO_x$ contained in the gaseous stream; followed by
   (b) heating the sorbent body to a temperature greater than about 600° C., producing an effluent comprising a concentrated stream of $NO_x$ and channeling the effluent therefrom to a solid-oxide electrochemical cell to electrochemically reduce the effluent to $N_2$ and $O_2$.

2. The method of claim 1, wherein the sorbent body is comprised of an alkaline earth metal salt.

3. The method of claim 1, wherein the sorbent body is comprised of an alkali metal salt.

4. The method of claim 3, wherein the sorbent body is comprised of sodium carbonate.

5. The method of claim 1, wherein the sorbent body is comprised of a mixture of an alkaline earth metal salt and an alkali metal salt.

6. The method of claim 1, wherein the solid-oxide electrochemical cell comprises a first, cathodic face through which the effluent is introduced, a second, anodic face, and, contained therebetween, an oxygen ion conducting metal oxide.

7. The method of claim 1, wherein the sorbent body is comprised of an alkaline earth metal oxide.

8. The method of claim 7, wherein the sorbent body is comprised of magnesium oxide.

9. The method of claim 7, wherein the sorbent body is comprised of calcium oxide.

10. The method of claim 1, wherein the sorbent body is comprised of an alkali metal oxide.

11. The method of claim 10, wherein the sorbent body is comprised of lithium-magnesium oxide.

12. The method of claim 1, wherein the sorbent body is comprised of a mixture of an alkaline earth metal oxide and an alkali metal oxide.

13. An apparatus for the removal of nitrogen oxides from a feed gas and subsequent catalytic dissociation thereof, comprising:
   an inlet means for introducing the feed gas into the apparatus;
   a gas line enabling passage of the feed gas from the inlet means to a first sorbent cell comprised of an alkaline earth metal salt, an alkaline earth metal oxide, an alkali metal salt, an alkali metal oxide, or a mixture thereof;
   a heating means for heating the sorbent cell, causing desorption of nitrogen oxide-containing effluent;
   a means for carrying the nitrogen oxide-containing effluent from the sorbent cell to a solid-oxide electrochemical cell; and
   a solid-oxide electrochemical cell comprising a first, cathodic face through which the effluent is introduced, a second, anodic face, and, contained therebetween, an oxygen ion conducting metal oxide; and
   a means for applying a dc potential across the solid-oxide electrochemical cell.

14. The apparatus of claim 13, wherein the sorbent body is comprised of an alkaline earth metal salt.

15. The apparatus of claim 13, wherein the sorbent body is comprised of an alkali metal salt.

16. The apparatus of claim 15, wherein the sorbent body is comprised of sodium carbonate.

17. The apparatus of claim 13, wherein the sorbent body is comprised of a mixture of an alkaline earth metal salt and an alkali metal salt.

18. The apparatus of claim 13, wherein the sorbent body is comprised of an alkaline earth metal oxide.

19. The apparatus of claim 13, wherein the sorbent body is comprised of an alkali metal oxide.

20. The apparatus of claim 19, wherein the sorbent body is comprised of magnesium oxide.

21. The apparatus of claim 19, wherein the sorbent body is comprised of calcium oxide.

22. The apparatus of claim 13, wherein the sorbent body is comprised of a mixture of an alkaline earth metal oxide and an alkali metal oxide.

23. The apparatus of claim 22, wherein the sorbent body is comprised of lithium-magnesium oxide.

24. An apparatus for the removal of nitrogen oxides from a feed gas and subsequent catalytic dissociation thereof, comprising:
   an inlet means for introducing the feed gas into the apparatus;
   a gas line enabling passage of the feed gas from the inlet means to two or more sorbent cells, wherein the cells are comprised of an alkaline earth metal salt, an alkaline earth metal oxide, an alkali metal salt, an alkali metal oxide, or a mixture thereof;
   a heating means for heating the sorbent cells, causing desorption of nitrogen oxide-containing effluent;
   a means for carrying the nitrogen oxide-containing effluent from the sorbent cells to a solid-oxide electrochemical cell; and
   a solid-oxide electrochemical cell comprising a first, cathodic face through which the effluent is introduced, a second, anodic face, and, contained therebetween, an oxygen ion conducting metal oxide; and
   a means for applying a dc potential across the solid-oxide electrochemical cell.

25. The apparatus of claim 24, wherein the sorbent cells are arranged in a parallel configuration.

26. The apparatus of claim 25, wherein the sorbent body is comprised of an alkaline earth metal salt.

27. The apparatus of claim 25, wherein the sorbent body is comprised of an alkali metal salt.

28. The apparatus of claim 25, wherein the sorbent body is comprised of a mixture of an alkaline earth metal salt and an alkali metal salt.

29. The apparatus of claim 25, wherein the sorbent body is comprised of an alkaline earth metal oxide.

30. The apparatus of claim 25, wherein the sorbent body is comprised of an alkali metal oxide.

31. The apparatus of claim 25, wherein the sorbent body is comprised of a mixture of an alkaline earth metal oxide and an alkali metal oxide.

* * * * *